(12) United States Patent
Babkes

(10) Patent No.: US 6,634,789 B2
(45) Date of Patent: Oct. 21, 2003

(54) ELECTRONIC THERMOMETER

(75) Inventor: Mitchell H. Babkes, Maryland Heights, MO (US)

(73) Assignee: Sherwood Services AG, Schaffhausen (CH)

(*) Notice: Subject to any disclaimer, the term of this patent is extended or adjusted under 35 U.S.C. 154(b) by 0 days.

(21) Appl. No.: 09/867,096

(22) Filed: May 29, 2001

(65) Prior Publication Data

US 2002/0181545 A1 Dec. 5, 2002

(51) Int. Cl.[7] .......................... B65D 85/38; G01K 1/14; G01K 1/08
(52) U.S. Cl. ................ 374/208; 374/183; 374/158; 206/306
(58) Field of Search ............................. 374/158, 208, 374/209, 163, 170, 194; 206/306

(56) References Cited

U.S. PATENT DOCUMENTS

| | | | | |
|---|---|---|---|---|
| 3,681,991 A | * | 8/1972 | Eberly, Jr. .............. 73/362 AR |
| 3,822,598 A | * | 7/1974 | Brothers et al. ........ 73/362 AR |
| 3,872,728 A | * | 3/1975 | Joyce et al. ............ 73/362 AR |
| 4,007,832 A | | 2/1977 | Paull et al. .................. 206/306 |
| 4,008,614 A | | 2/1977 | Turner et al. ............. 73/343 R |
| 4,260,058 A | | 4/1981 | Paull et al. ................. 206/443 |
| D260,737 S | | 9/1981 | Manno ........................ D10/57 |
| 4,497,585 A | | 2/1985 | Paull et al. .................. 374/158 |
| 4,572,365 A | | 2/1986 | Bruno et al. ................ 206/306 |
| 4,602,642 A | * | 7/1986 | O'Hara et al. .............. 128/664 |
| 4,619,271 A | | 10/1986 | Burger et al. ............... 128/736 |
| 5,169,235 A | * | 12/1992 | Tominaga et al. .......... 374/129 |
| 5,305,381 A | * | 4/1994 | Wang et al. ................. 379/455 |
| D356,964 S | | 4/1995 | Turo et al. .................... D10/60 |
| 6,006,120 A | * | 12/1999 | Levin .......................... 600/323 |
| 6,186,959 B1 | * | 2/2001 | Canfield et al. ............ 600/559 |
| 6,386,251 B1 | * | 5/2002 | Koch et al. .............. 152/152.1 |
| 2003/0002562 A1 | * | 1/2003 | Yerlikaya et al. ........... 374/208 |

* cited by examiner

*Primary Examiner*—Christopher W. Fulton
*Assistant Examiner*—Gail Verbitsky
(74) *Attorney, Agent, or Firm*—Elizabeth A. O'Brien; Lawrence P. Zale

(57) ABSTRACT

An improved electronic thermometer for rectal, oral, and axillary temperature measurements includes a removable module that houses a temperature sensitive probe and isolation chamber as well as a supply of clean, uncontaminated disposable probe covers on a single color coded module. Each removable module is interchangeably operable with a single temperature calculating unit. This thermometer design reduces the risk of patient exposure to all of the common sources of contamination encountered in the use of electronic thermometers by isolating the probe, the isolation chamber, and a supply of disposable probe covers on one dedicated removable module.

26 Claims, 6 Drawing Sheets

ELECTRONIC THERMOMETER

FIELD OF THE INVENTION

This invention relates to electronic thermometers, particularly those which utilize temperature sensitive probes and probe covers.

BACKGROUND OF THE INVENTION

Electronic thermometers have been widely used for quick and accurate measurements of body temperature. A temperature sensing probe is inserted orally, rectally, or in an axillary (under the arm) position to measure a patient's temperature. The temperature sensitive probe is connected to the thermal circuitry in a temperature calculating unit by an electrical cable. The temperature sensitive probe generates a signal. This signal passes through the electrical cable to the temperature calculating unit, where the signal is converted into an equivalent temperature reading. The temperature calculating unit has a digital display which shows the calculated temperature reading.

Before each measurement, a disposable plastic probe cover is placed over the probe. The probe cover is then disposed after each temperature reading and a new probe cover is used for each subsequent measurement. When not in use, the temperature sensitive probe is stored in a housing, well, or recess associated with the temperature calculating unit to minimize probe damage and probe contamination.

Prior art electronic thermometers are susceptible to at least three major sources of contamination in typical use. First, these thermometers employ the same temperature sensitive probes for oral, rectal, and axillary temperature measurements. Even though disposable plastic probe covers are used for each measurement, cross-contamination may still result from use of the same probe. Therefore, rectal or axillary contaminants on the probe may be passed orally to the same patient, or other patients.

The second source of contamination involves the probe storage chamber. Probes are stored in a single housing recess connected to the temperature calculating unit. This recess, once contaminated, may spread contamination to other probes as they may be interchangeably stored in the same recess. Over time the storage chamber may also collect debris and contamination from the storage of multiple probes. So again, contaminants on the probe from rectal or axillary use may be passed orally to the same patient, or other patients.

The third source of contamination relates to the disposable probe covers. Each time a patient's temperature is measured, the probe is inserted into a box of unused disposable probe covers. The probes of the prior art share a common source of probe covers, so different probes are repeatedly inserted into the same carton. The probe, then, once contaminated, may spread contamination to other unused probe covers. Contaminants deposited on the unused probe cover may then be passed on to the same patient, or other patients.

Since electronic thermometers are used for oral, axillary, and rectal temperature measurements, universal color codes have been adopted by hospitals, using red probes for rectal temperature measurements and blue probes for oral and axillary temperature measurements. This color coding system makes it very easy for the healthcare practitioner to use the proper probe for each temperature reading, reducing the potential for cross-contamination.

The use of a blue probe for oral and axillary temperature measurements and a red probe for rectal temperature measurements reduces the first source of contamination. Separating probe use in this manner also improves patient perception issues related to the health practitioner using the same probe for all types of temperature measurements. Such practice, however, requires two thermometer units to be available at each location if the probes are not interchangeable. Maintaining two units at each location has been considered an inefficient and costly measure. Such a practice also makes the practitioner susceptible to using the most convenient, yet inappropriate, unit.

Some have developed thermometers with detachable probe units. U.S. Pat. No. 4,008,614, assigned to Johnson & Johnson, New Brunswick, N.J., discloses an electronic thermometer unit usable with an oral temperature probe permanently attached to an oral isolation chamber. Similarly, there is a rectal probe permanently attached to a rectal isolation chamber. Connecting the probe and isolation chamber together as one unit thus precludes the inadvertent use of a probe with the wrong isolation chamber.

Similarly, U.S. Pat. No. 4,619,271, assigned to Cheesebrough-Pond's, Inc., discloses an independent replaceable probe unit including a probe member and a probe chamber for holding the probe member, which can be easily removed and replaced together as a unit. The probe, cable, and isolation chamber are all the same color. The permanent connection assures that the health practitioner stores the probe in the proper isolation chamber, thus reducing the risk of contamination leading to infection. A significant limitation of each of these approaches is that even though the probe is permanently attached to an isolation chamber, both the oral and rectal probe units will be repeatedly and interchangeably inserted into the same box or boxes of probe covers, still exposing the probe to possible contamination.

U.S. Pat. No. 4,572,365, assigned to Cheesebrough-Pond's Inc., discloses an improved probe cover holding and dispensing arrangement, the objective of which is to provide convenient access to clean probe covers. An electronic thermometer housing contains a chamber for receiving a carton of probe covers. Once the carton is inserted and secured within the housing, an aperture in the thermometer housing, normally closed by a sliding cover, provides access to the inserted carton of probe covers. Still, in this arrangement, the probe and isolation unit may be interchanged between oral and rectal without changing the cartridge of probe covers. Both oral and rectal probe units share access to the same source of probe covers, providing a source of cross-contamination.

U.S. Pat. No. 4,260,058 to Seymour et al. discloses an arrangement of mounting a holder on top of the thermometer device to receive a cartridge of probe covers. However, in this approach, probe covers are still stored with the temperature calculating unit. The disclosed arrangement does not require a dedicated probe and isolation chamber. This again may allow both oral and rectal probes access to a shared source of probe covers, providing a source of contamination.

Each of these prior art approaches fails to address the exposure to contamination as each temperature sensitive probe, oral or rectal, is repeatedly inserted into the same box or boxes of probe covers. In each approach, the same source of probe covers is used whether the covers are stored in connection with the temperature calculating unit or separate from the thermometer altogether.

Currently there is a need for an electronic thermometer which reduces patient exposure to all sources of cross-contamination, aids in infection control, and provides a clean, uncontaminated, readily accessible source of probe covers.

SUMMARY

It is therefore an object of this invention to provide a thermometer that reduces all three major sources of contamination and cross-contamination by eliminating the use of the same probe for oral, axillary, and rectal temperature measurements, the use of the same storage chamber for each type of probe, and the use of the same supply of probe covers for each type of probe.

It is another object of this invention to provide a removable module capable of receiving and storing both a temperature sensitive probe and a clean, uncontaminated supply of disposable probe covers.

It is a further object of this invention to provide a removable module with an isolation chamber that prevents the storage of a temperature sensitive probe with a probe cover remaining on the probe.

It is yet another object of this invention to provide a removable module that allows the practitioner to readily view a supply of probe covers through a transparent module housing without disassembling or physically contacting the removable module.

It is still another object of this invention to provide a module housing which aids in infection control by being easily cleaned or inexpensively replaced.

The present invention reduces the risk of a patient's exposure to all of the common sources of contamination encountered in the use of electronic thermometers. The minimization in risk is accomplished by isolating the storage of the temperature sensitive probe and the disposable probe covers used for oral, axillary, and rectal temperature measurements into dedicated units, or modules.

This invention features at least two types of removable modules interchangeably operable with one temperature calculating unit. The removable module is comprised of a probe assembly and a module housing. The module housing includes two chambers, one to store the probe and one to store a fresh supply of probe covers. Each of the module housing and probe assembly are color coded according to the standard convention of red for rectal measurements and blue for oral and axillary measurements.

In the described embodiment, a red probe assembly is attached to a red module housing, the housing containing an isolation chamber to store the temperature sensitive probe and a storage chamber to store a supply of disposable probe covers. Similarly, a blue probe assembly is attached to a blue module housing, the housing containing an isolation chamber to store the temperature sensitive probe and a storage chamber to store a supply of disposable probe covers. The removable module requires that the rectal probe, with the supply of probe covers, is used only with the rectal probe. These dedicated modules prevent the commingling of the probe, the isolation chamber, and the probe cover supply during temperature measurement, thus minimizing thermometer contamination.

Another feature of the present invention is that the module housing may be made of a translucent or transparent material. The transparent, or partially transparent, housing allows the healthcare practitioner to conveniently view the remaining supply of probe covers at any given time. The carton of disposable probe covers described in the preferred embodiment has a tear away top and/or side panels. When these cartons are used together with the transparent or partially transparent removable module, the healthcare practitioner can view and count the remaining probe covers through the module housing. This improved design provides an easily viewable arrangement that helps avoid the necessity to physically contact the housing or probe covers in order to check the remaining supply.

These and additional features and advantages of the invention disclosed here will be further understood from the following detailed disclosure of the preferred embodiment.

DETAILED DESCRIPTION OF THE PREFERRED EMBODIMENT

Figure 1:
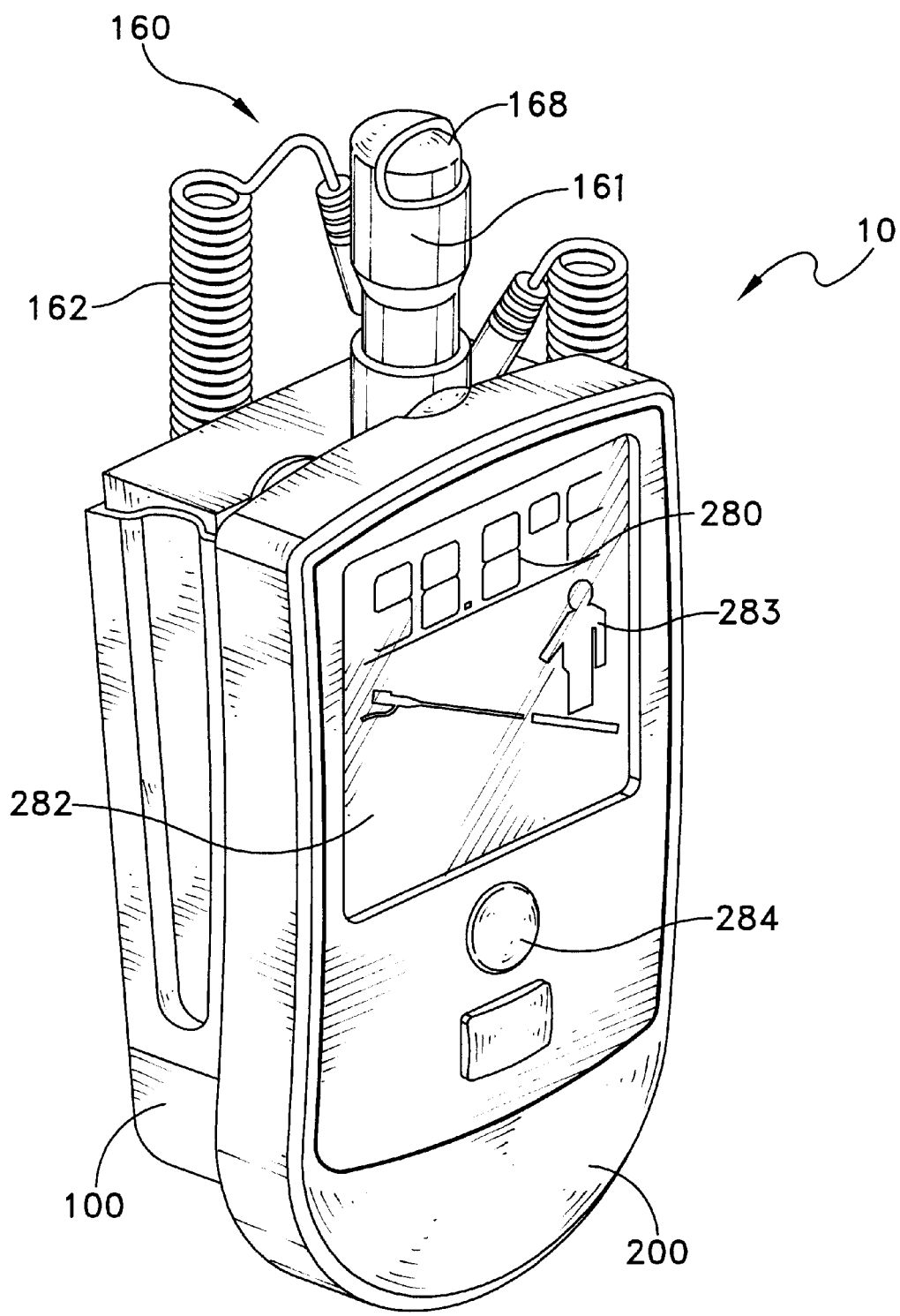
FIG. 1 is a perspective view of an electronic thermometer according to the present invention.
Figure 2:
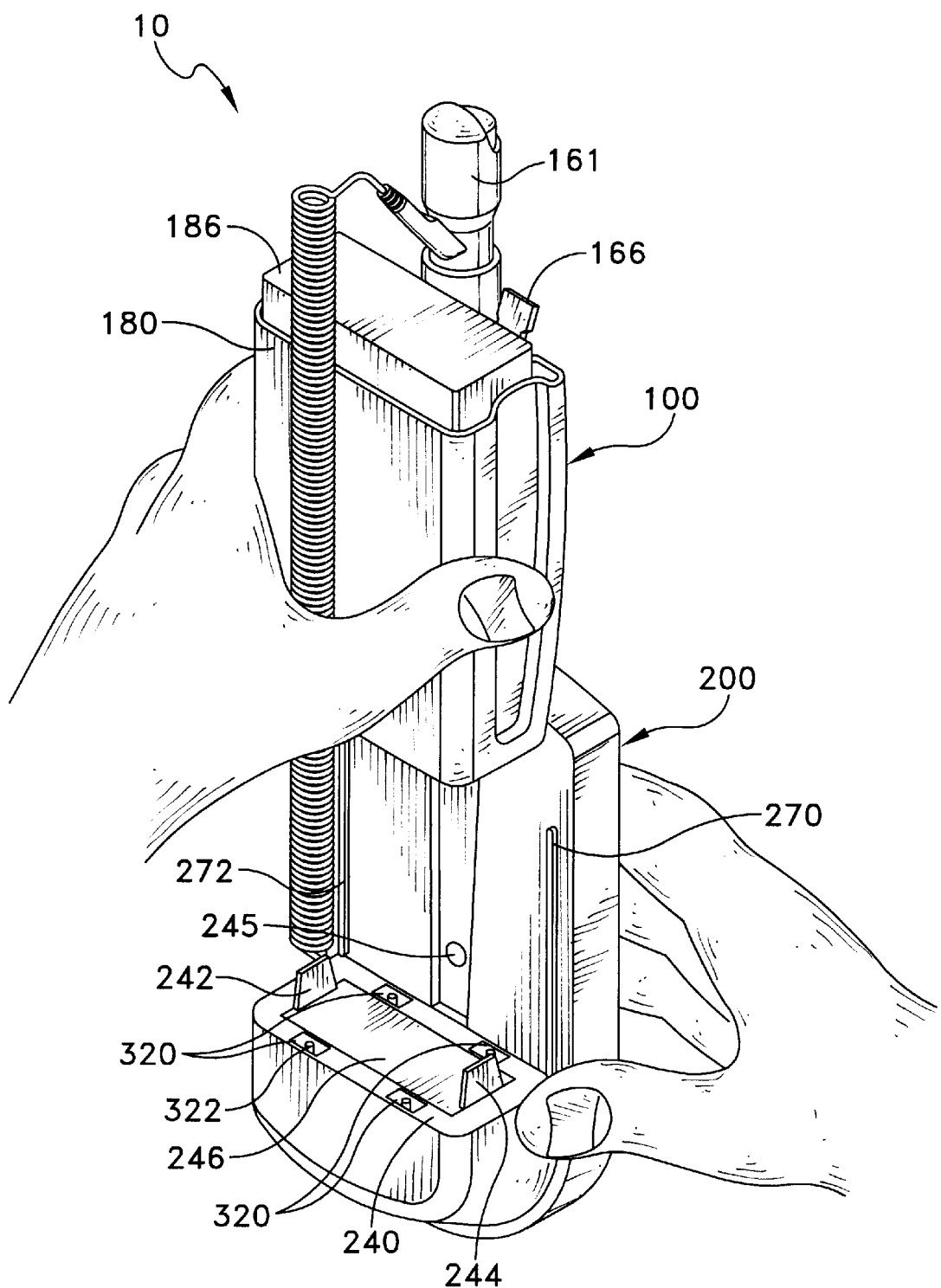
FIG. 2 is a perspective view of an electronic thermometer showing a removable module being secured to a temperature calculating unit.
Figure 5:
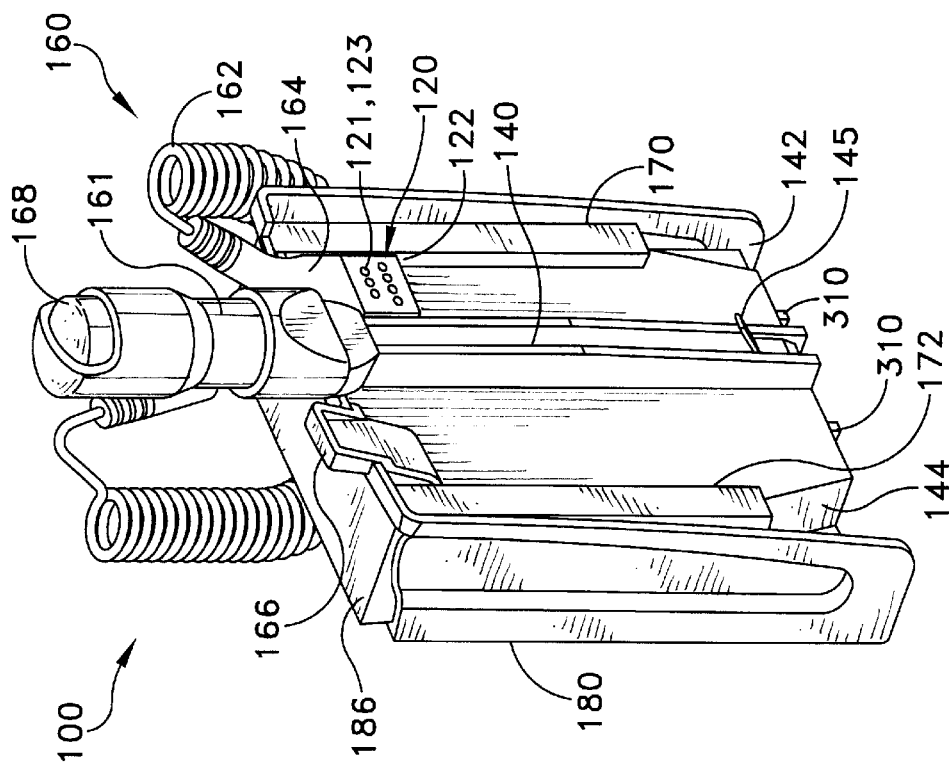
FIG. 5 is a rear perspective view of a removable module showing the connection means for securing to the temperature calculating unit.
Figure 4:
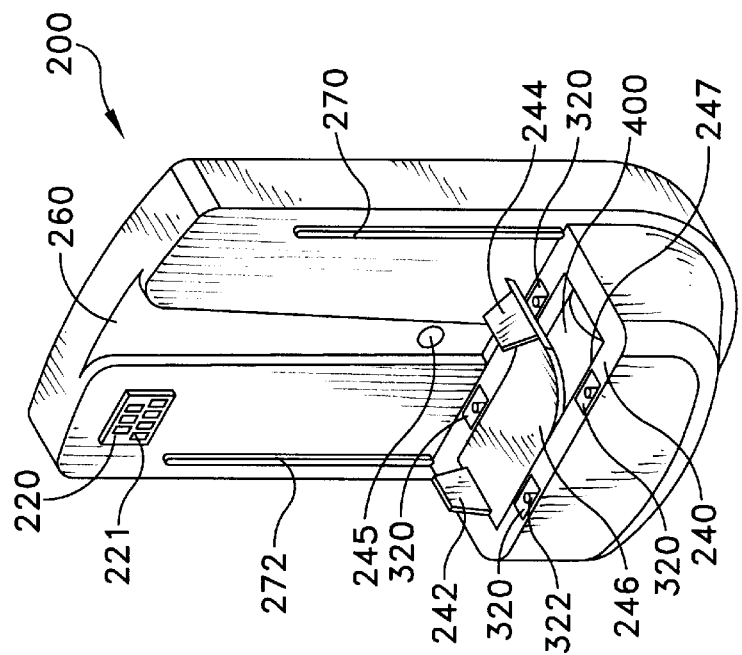
FIG. 4 is a rear perspective view of a temperature calculating unit showing the connection means for securing to the removable module.

FIGS. 1 and 2 show a thermometer 10 according to the present invention. Thermometer 10 includes a temperature calculating unit 200 to which a removable module 100 is secured. When removable module 100 is secured to temperature calculating unit 200, a first connector component 120 and a second connector component 220, shown in FIGS. 4 and 5, are properly aligned and together form a connection. This connection allows a signal detected by probe 161 to be transmitted from removable module 100 to temperature calculating unit 200. Once received the temperature calculating unit 200 converts the signal to a temperature reading 280. Temperature reading 280 is observed through a display window 282.

Figure 3:
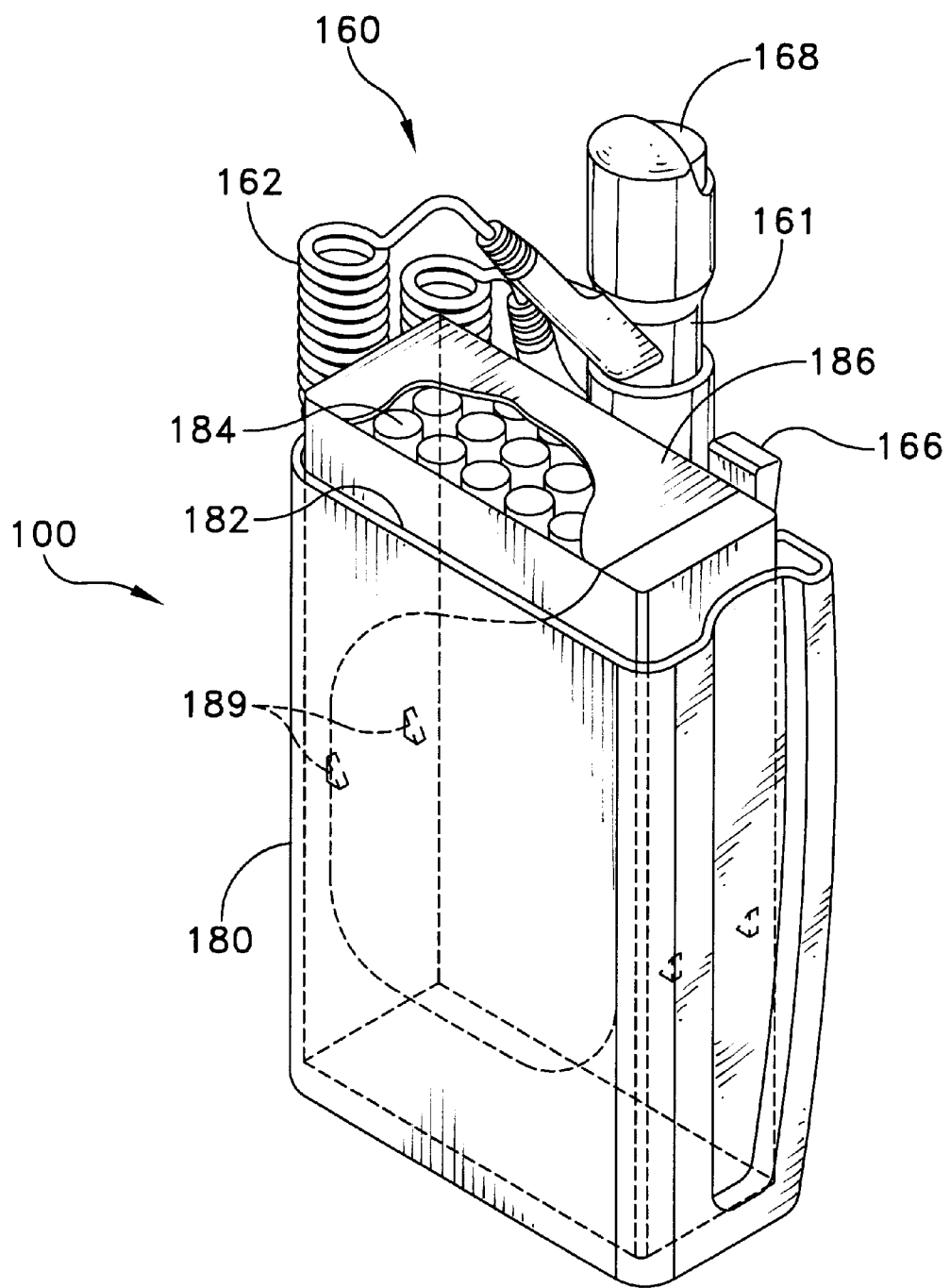
FIG. 3 is a rear perspective view of the removable module of FIGS. 1 and 2.

With reference now to FIGS. 3 and 5, removable module 100 comprises a temperature sensitive probe assembly 160 and a module housing 180. The probe assembly 160 further comprises a probe 161, an electrical cable 162, and the first connector component 120. Temperature sensitive probe 161 is attached to electrical cable 162, which is connected at the opposite end to the first connector component 120. Probe assembly 160 locks into module housing 180 at a housing orifice 122. Probe assembly 160 may be unlocked and detached from the module housing 180 for replacement if needed, but under normal operating conditions it is fixedly attached to the module housing 180.

Module housing 180 contains a isolation chamber 140 and a storage chamber 182. As best shown in FIG. 5, isolation chamber 140 is positioned in the center of the backside wall of module housing 180. Probe 161, when not in use, is inserted into the isolation chamber 140. When the removable module 100 is in its secured position to the temperature calculating unit 200, the probe 161 rests between the temperature calculating unit 200 and the storage chamber 182, providing additional physical protection to probe 161. Although this is the preferred location, the isolation chamber 140 may be located anywhere within module housing 180 for purposes of this invention. The inside diameter of the isolation chamber 140 corresponds to the outside diameter of the probe 161 such that probe 161 cannot be inserted into the isolation chamber 140 with a probe cover 184 still attached to probe 161.

Since the probe 161 and the isolation chamber 140 are both components of the same removable module 100, the probe 161 can be stored in one and only one isolation chamber 140, thus reducing the possibility of cross-contamination and spread of infection. If there is concern that the isolation chamber 140 has in any way been contaminated, the entire removable module 100 may be removed for submersion cleaning. Alternatively, the module housing 180 may be inexpensively replaced.

At the bottom of isolation chamber 140 there is a switch actuating device, such as a paddle indicator 145 shown on FIG. 5, which triggers an automatic on/off mechanism. When the probe 161 is inserted into isolation chamber 140 during periods of non-use, the probe 161 pushes the paddle indicator 145, bending it into contact with button 245 on temperature calculating unit 200 (shown on FIG. 4). Button 245 is linked to the electronics of the temperature calculating unit 200. When depressed, button 245 causes the temperature calculating unit 200 to turn off. Upon withdrawal of the probe 161 from the isolation chamber 140, the paddle indicator 145 releases. This causes the temperature calculating unit 200 to turn on and prepare for a temperature measurement. This automatic on/off mechanism conserves the battery life of the temperature calculating unit 200.

Paddle indicator 145 may also be used as a reset button, indicating when a new temperature reading may be taken. If the temperature calculating unit 200 has a timed shut off mechanism, the paddle indicator 145 may be used to reactivate the temperature calculating unit 200. This may be accomplished by inserting and removing probe 161 from isolation chamber 140, thus triggering the paddle indicator 145 and turning on temperature calculating unit 200. The paddle indicator 145 may be any type of mechanical, electrical, magnetic or optical switch capable of differentiating between the presence and absence of the probe 161 in the isolation chamber 140.

Figure 7:
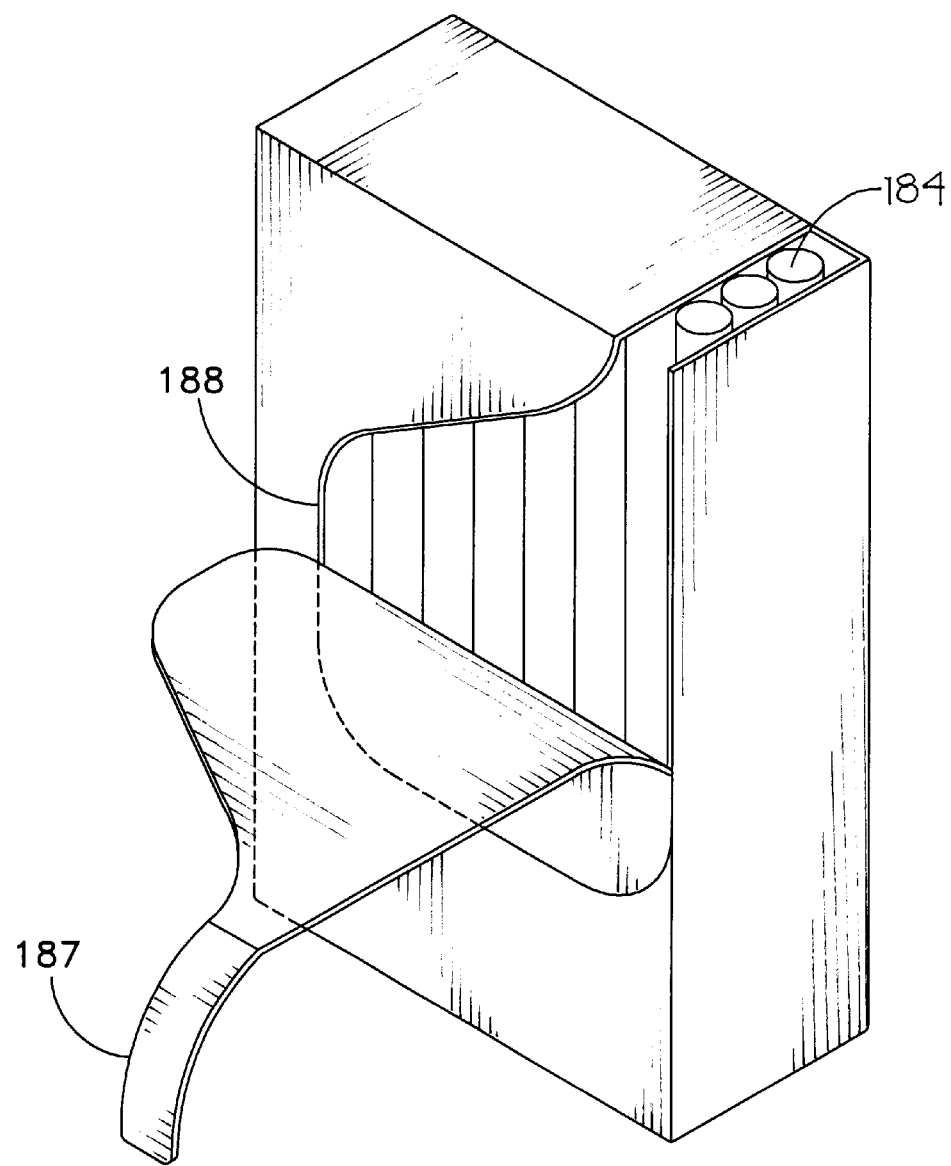
FIG. 7 shows a perspective view of a carton design to hold disposable probe covers.

Referring now to FIG. 3, module housing 180 also contains the storage chamber 182. A carton 186 of disposable probe covers containing disposable probe covers 184 fits snugly into the storage chamber 182. The carton 186 may be perforated with tabs such that the practitioner can pull a perforated tear away tab and expose several probe covers 184. For example, FIG. 7 shows a carton 186 used with the current embodiment. A perforated top tab 187, when pulled, tears a portion of the top of carton 186 to provide an opening for the probe 161 to insert into a disposable probe cover 184. Similarly, a side panel perforation 188 may start at the top and remove a side panel. The cartons 186 may be designed with one or both of the perforated top tab 187 and the side panel perforation 188. As will be described in more detail below, these designs provide a convenient means for the practitioner to take inventory of the supply of probe covers 184 contained within storage chamber 182.

In an alternate embodiment, the storage chamber 182 may contain means to prevent the box of disposable covers from being removed and used interchangeably with other removable modules 100. For example, as shown on FIG. 3, the storage chamber 182 may contain small projections 189 that puncture the sides of the carton of probe covers 186 such that if one attempts to remove the carton, the carton rips. In another embodiment, the carton 186 may have a perforated bottom that tears. Therefore, if the carton is removed, the bottom would tear out. The practitioner would then need to insert a fresh carton 186 of probe covers 184 into the storage chamber 182. This deters one from switching the probe covers from one removable module to another, increasing the potential for cross-contamination.

The entire removable module 100, including the probe 161, the electrical cable 162, the first connector component 120, and the module housing 180, is color coded according to the standard convention of blue for oral and axillary measurements and red for rectal measurements. In addition to being color coded, the module housing 180 of the present embodiment is transparent or translucent. Such a transparent housing allows the practitioner to conveniently view and count the number of probe covers 184 remaining in the carton 186 at any given time. Transparency of the module housing 180 also allows the practitioner to read the information on the carton 186, including instructions for use, warnings, and reordering information. The completely transparent module housing 180 is one example of the present invention and should not be limiting to the invention.

The module housing 180 may have, for example, one transparent portion only, such as any one side, top, front, or back panel. When the carton 186 shown in FIG. 7 contains a top perforated tab 187, the contents may be viewed through a transparent top. Similarly, when the carton 186 contains a side panel perforation, the contents may be viewed through a transparent back panel on the module housing 180. In these situations it is necessary only to have one transparent or translucent top portion or side panel to the module housing 180 for viewing and counting.

Figure 6:
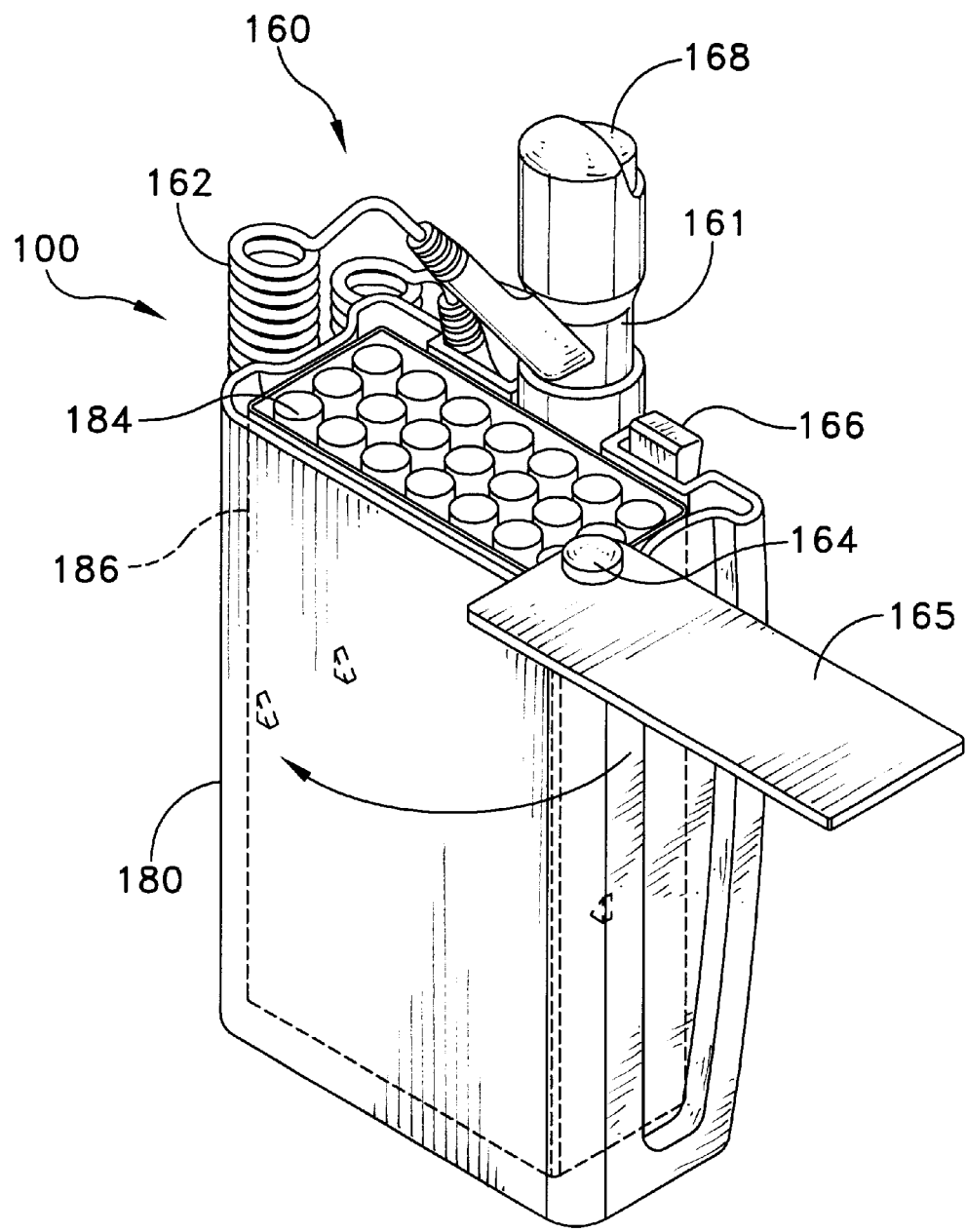
FIG. 6 is a rear perspective view of an alternate embodiment of a removable module.

In an alternate embodiment shown in FIG. 6, storage chamber 182 is enclosed by a transparent cover 165 that pivots open on module housing 180. The storage chamber 182 will remain closed when not being used. To access the probe covers 184, cover 165 may pivot open around bushing 164. Again, the supply of covers 184 may be viewed through cover 165.

The module housing 180 has fastening means to aid in mounting the removable module 100 to the backside of the temperature calculating unit 200. As best shown in FIGS. 4 and 5, the fastening means used in the current embodiment are tracks 170 and 172, which are molded recesses in module housing 180. These tracks 170 and 172 receive rails 270 and 272 on the temperature calculating unit 200. In addition, the module housing 180 contains securing means 142 and 144, which are also molded recesses in the module housing 180. Recesses 142 and 144 receive securing means 242 and 244 located on a mounting surface 240 of the temperature calculating unit 200. Removable module 100 is attached to the temperature calculating unit 200 by first aligning the rails 270 and 272 with tracks 170 and 172 and securing means 142 and 144 with securing means 242 and 244, then sliding the removable module 100 down on to the mounting surface 240 until a locking tab 166 snaps into place over the top edge of the temperature calculating unit 200. It should be understood that fastening means, securing means, and locking tab, as defined by this invention, could be any connection device or configuration of connection devices that serve to firmly secure the removable module 100 in position on the temperature calculating unit 200.

Temperature calculating unit 200 has a second connector component 220 located on the side to which the removable module 100 is mounted. Second connector component 220 is wired to the thermometer circuitry within the temperature calculating unit 200. When the removable module 100 is secured to the temperature calculating unit 200, first connector component 120 and second connector component 220 mate to form an electrical connection. The temperature calculating unit 200 receives the signal detected by probe 161, transmitted through first and second connector components 120 and 220, and converts the signal into a temperature reading 280. The resulting temperature reading 280 is observed through the display window 182.

The circuitry of temperature calculating unit 200 is powered by a battery 400. The battery 400 is accessed through a cover 246 that fits into orifice 247 within mounting surface 240. In the preferred embodiment shown in FIG. 4, cover 246 is made from rubber to create a water tight seal enabling the entire temperature calculating unit 200 to be submersed in water for cleaning. The cover 246 in this preferred embodiment further comprises the securing means 242 and 244. To replace battery 400, cover 246 is peeled away from the mounting surface 240 to expose the battery 400.

Referring again to FIGS. 4 & 5, in an alternate embodiment removable module 100 and temperature calculating unit 200 also include means to detect the type of removable module 100 secured to the temperature calculating unit 200. Such means may include a two part switch which enables the temperature calculating unit 200 to sense the presence of an object connected to mounting surface 240. Temperature calculating unit 200 may have a plurality of recesses 320 on the mounting surface 240, each recess 320 containing a trigger device 322. There may be a plurality of corresponding protrusions, such as posts 310, on removable module 100. When removable module 100 is connected to temperature calculating unit 200, posts 310 fit into recesses 320, triggering switches 322. Switches 322 are then sensed by temperature calculating unit 200. Each type of removable module 100 may have a different number or location of posts 310. For example, an oral module 100 may have one post 310 which corresponds to switch 322 within recess 320 while the rectal module may have no posts 310 to trigger switches 322. Two alternative signals result. These two part switches then enable temperature calculating unit 200 to detect the type of removable module attached. Once the module type is detected temperature calculating unit 200 calibrates in order to make the appropriate temperature measurements. Additionally, including two recesses on mounting surface 240 provide the temperature calculating unit 200 with the capability of differentiating four different types of modules and operating accordingly. It should be understood, however, that the two part switches described may consist of any known electrical, mechanical, magnetic or optical switch.

In another alternate embodiment first and second connector components 120 and 220 may carry encoded information related to probe identity and associated calibration parameters. Such encoded information enables temperature calculating unit 200 to detect the type of removable module 100 attached. As shown on FIGS. 4 & 5, spring loaded posts 121 and pogo pins 123 on first connector component 120 may be used to engage contact pads 221 on second connector component 220. Again, for purposes of this invention, the first and the second connector components may be any mechanical, electrical, magnetic or optical contacts such that when the two connection components are in proximity, a signal can pass from the removable module 100 to the temperature calculating unit 200. Thus, when removable module 100 is connected to temperature calculating unit 200, temperature calculating unit 200 reads the encoded information carried by the attached removable module 100 and automatically sets the corresponding operating conditions.

In both alternate embodiments, when the oral/axillary module 100 is connected to the temperature calculating unit 200, temperature calculating unit 200 reads the identity of the oral/axillary probe 161. Second connector component 220, connected to the electronic circuitry of the temperature calculating unit 200, in turn causes the display of an oral/axillary icon 283 located within window 282, as shown on FIG. 1. This indicates to the practitioner that the thermometer 10 is ready to operate in the oral/axillary mode. Similarly, when the rectal module 100 is connected to the temperature calculating unit 200, temperature calculating unit 200 reads the identity of a rectal module 100 and displays a corresponding icon 283 within window 282, indicating that the thermometer 10 is ready to operate in the rectal mode.

When a temperature measurement is to be taken the practitioner selects the appropriate module and mounts the removable module 100 on to the temperature calculating unit 200. By way of example, if an oral temperature measurement is desired, the blue removable module 100 is secured to temperature calculating unit 200 by aligning the rails 270 and 272 of the temperature calculating unit 200 and the tracks 170 and 172 of the removable module 100. Once aligned the practitioner slides the removable module 100 downward such that the bottom of the module 100 rests on mounting surface 240 and securing means 242 and 244 mate with recesses 142 and 144 until locking tab 166 snaps into place. This attaching process is best shown in FIG. 2. When secured in this manner, first connector component 120 and second connector component 220 form the connection to activate the thermometer 10.

The temperature sensitive probe 161 is removed from the isolation chamber 140, activating the thermometer to ready mode. Probe 161 is then inserted into a probe cover 184 within storage chamber 182. Insertion of the probe 161 into the probe cover 184 creates a snap fit between the probe 161 and probe cover 184. The probe 161 is withdrawn from the carton 186 with cover 184 attached. The practitioner pushes button 284, shown on FIG. 1, to select the oral or axillary mode. A short beep indicates that the thermometer 10 is ready to take a measurement. Probe 161 is inserted into the patient's mouth. When the measurement is complete a long beep is sounded and the final temperature reading 280 is displayed. Temperature reading 280 is observed through display window 282. The probe 161 is withdrawn from the patient's mouth. Button 168 is then depressed to eject the probe cover 184 into a bio waste container, which is then disposed according to current medical practices or local regulations regarding disposal of infectious, biological waste. Probe 161 may then be inserted into another probe cover 184 in carton 186 again if another reading is desired. Alternatively, probe 161 is inserted back into the isolation chamber 140 for storage. The insertion of the probe 161 into the isolation chamber 140 switches the thermometer 10 to standby mode.

If a rectal temperature measurement is next desired, it is necessary only to change the removable module 100. To remove the oral module 100, the practitioner first pulls back on the locking tab 166. Once the tab 166 is released, the practitioner slides the module 100 off of rails 270 and 272 to disengage the module from the temperature calculating unit 200. The rectal module 100 is then secured to temperature calculating unit 200 in the manner described above.

In the embodiment described, then, the probe, the isolation chamber, and the probe covers are contained within one unit, the removable module. This removable module prevents the interchangeable use of the probe, the isolation chambers for storage, and probe covers. Thus the removable module of the current invention reduces all major sources of contamination by preventing the commingling of the probe, the isolation chamber, and the disposable probe covers. At the same time the thermometer unit of the current invention remains cost effective since it requires only one temperature calculating unit to use with all types of probes.

It is to be understood that the described embodiments of the invention are illustrative only, and that modifications thereof may occur to those skilled in the art. Accordingly, this invention is not to be regarded as limited to the embodiments disclosed, but is to be limited only as defined by the appended claims.

I claim:

1. An electronic thermometer comprising:
   a. a probe for sensing the temperature and creating an electronic signal representative of the sensed temperature;
   b. a module housing having an isolation chamber for receiving and storing said probe, a storage chamber for storing a carton of probe covers, and a first connector component electrically communicating said signal;
   c. a cable connecting said probe to said module housing for delivering said electronic signal from said probe to said module housing;
   d. a temperature calculating unit having a second connector component for electrically communicating with said temperature calculating unit and having internal electronic circuitry capable of receiving said signal representing a temperature reading, converting said signal into said temperature reading, and displaying said temperature reading in a visible display;
   e. a connector comprising said first and said second component, said first connector component electrically communicating with cable, and said second connector component electrically communicating with the internal electronic circuitry of said temperature calculating unit, for passing said signal from said module housing to the internal electronic circuitry in order to convert said signal to an equivalent temperature reading.

2. The electronic thermometer of claim 1 wherein said temperature calculating unit further comprises a mounting surface having securing means thereon.

3. The electronic thermometer of claim 1 wherein said temperature calculating unit further comprises fastening means to secure said module housing to said temperature calculating unit.

4. The electronic thermometer of claim 3, wherein said fastening means are rails which engage the fastening means on said removable module.

5. The electronic thermometer of claim 1 wherein said module housing further comprises fastening means for engaging said fastening means on said temperature calculating unit.

6. The electronic thermometer of claim 5, wherein said fastening means are tracks.

7. The electronic thermometer of claim 1 wherein said module housing further comprises securing means for engaging said securing means on said temperature calculating unit.

8. The electronic thermometer of claim 1, wherein said module housing further comprises a locking tab to secure said module housing to said temperature calculating unit.

9. The electronic thermometer of claim 1, wherein said probe, said cable, and said module housing are color coded according to standard colors adopted by hospitals.

10. The electronic thermometer of claim 1 wherein said module housing is comprised of a translucent or transparent material.

11. The electronic thermometer of claim 1 wherein at least one portion of said module housing is comprised of a translucent or transparent material.

12. The electronic thermometer of claim 1 wherein said module housing further comprises a cover comprised of a translucent or transparent material.

13. The electronic thermometer of claim 1 wherein said storage chamber further at least one projection on an interior surface thereof to damage the carton of probe covers when removed from said storage chamber.

14. The electronic thermometer of claim 1 wherein said isolation chamber further comprises a switch actuating device which triggers an automatic on/off mechanism between said module housing and said temperature calculating unit.

15. The electronic thermometer of claim 1 wherein said temperature calculating unit further includes a button connected to the circuitry of said temperature calculating unit to cause an on/off response to a switch actuating device.

16. A removable module comprising:
   a. a probe assembly comprising a probe for sensing temperature and for creating a signal representative of said sensed temperature, a first connector component electrically communicating with a second connector component, and a cable connecting said probe to said first connector component;
   b. a module housing having an isolation chamber for receiving and storing said probe, and a storage chamber for storing a supply of probe covers;
   wherein said module housing further comprises fastening means for removably securing said removable module to a temperature calculating unit.

17. The removable module of claim 16, wherein said fastening means are tracks.

18. The removable module of claim 16 wherein said module housing further comprises securing means for engaging said securing means on said temperature calculating unit.

19. The removable module of claim 16, wherein said module housing further comprises a locking tab to secure said module housing to said temperature calculating unit.

20. The removable module of claim 16, wherein said probe assembly and said module housing are color coded according to standard colors adopted by hospitals.

21. The removable module of claim 16 wherein said module housing is comprised of a translucent or transparent material.

22. The removable module of claim 16 wherein at least one portion of said module housing is comprised of a translucent or transparent material.

23. The removable module of claim 16 wherein said module housing further comprises a cover comprised of a translucent or transparent material.

24. The removable module of claim 16 wherein said storage chamber further comprises at least one projection on an interior surface thereof to damage the carton of probe covers when removed from said storage chamber.

25. The removable module of claim 16 wherein the said isolation chamber further comprises a switch actuating device which triggers an automatic on/off mechanism between said module housing and said temperature calculating unit.

26. The removable module of claim 16 wherein said temperature calculating unit further comprises a button connected to the circuitry of said temperature calculating unit to cause an on/off response to said switch actuating device.

* * * * *